United States Patent
Islam et al.

(10) Patent No.: US 10,009,865 B2
(45) Date of Patent: Jun. 26, 2018

(54) RELIABILITY OF VoLTE/ViLTE CALLS

(71) Applicant: BlackBerry Limited, Waterloo (CA)

(72) Inventors: Muhammad Khaledul Islam, Ottawa (CA); Jeffrey William Wirtanen, Ottawa (CA); Yi Hai Zhang, Ottawa (CA); Shahid Rasul Chaudry, Ottawa (CA); Claude Jean-Frederic Arzelier, Molieres-sur-Ceze (FR)

(73) Assignee: BlackBerry Limited, Waterloo, Ontario (CA)

( * ) Notice: Subject to any disclaimer, the term of this patent is extended or adjusted under 35 U.S.C. 154(b) by 58 days.

(21) Appl. No.: 15/194,208

(22) Filed: Jun. 27, 2016

(65) Prior Publication Data

US 2017/0374635 A1    Dec. 28, 2017

(51) Int. Cl.
*H04W 4/00* (2018.01)
*H04W 60/00* (2009.01)
*H04W 76/19* (2018.01)

(52) U.S. Cl.
CPC ........... *H04W 60/00* (2013.01); *H04W 76/19* (2018.02)

(58) Field of Classification Search
CPC .......................... H04W 60/00; H04W 76/028
USPC ........................ 455/435.1; 370/338
See application file for complete search history.

(56) References Cited

U.S. PATENT DOCUMENTS

| | | | |
|---|---|---|---|
| 2013/0084856 A1* | 4/2013 | Prasad | H04W 36/0088 455/434 |
| 2013/0150024 A1* | 6/2013 | Burbidge | H04W 76/028 455/423 |
| 2014/0349694 A1* | 11/2014 | Raghothaman | H04W 36/00 455/509 |

FOREIGN PATENT DOCUMENTS

| | | |
|---|---|---|
| EP | 2339889 | 6/2011 |
| EP | 2421322 | 2/2012 |
| EP | 2903388 | 8/2015 |

OTHER PUBLICATIONS

3GPP TS 24.229 V13.5.1 (Mar. 2016); 3rd Generation Partnership Project; Technical Specification Group Core Network and Terminals; IP multimedia call control protocol based on Session Initiation Protocol (SIP) and Session Description Protocol (SDP); Stage 3 (Release 13).

3GPP TS 36.331 V13.1.0 (Mar. 2016); 3rd Generation Partnership Project; Technical Specification Group Radio Access Network; Evolved Universal Terrestrial Radio Access (E-UTRA); Radio Resource Control (RRC); Protocol specification (Release 13).

3GPP TS 36.304 V13.1.0 (Mar. 2016); 3rd Generation Partnership Project; Technical Specification Group Radio Access Network; Evolved Universal Terrestrial Radio Access (E-UTRA); User Equipment (UE) procedures in idle mode (Release 13).

(Continued)

*Primary Examiner* — Marcos Batista
(74) *Attorney, Agent, or Firm* — Fish & Richardson P.C.

(57) ABSTRACT

A method for improving reliability of Voice over LTE (VoLTE)/Video over LTE (ViLTE) calls includes detecting, by a User Equipment (UE) camped on a first Radio Access Technology (RAT), a problem with a radio connection on the first RAT at a first time. After detecting the problem with the radio connection, the UE blocks Non-Access Stratum (NAS) registration on a second RAT in a time period between the first time and a second time later than the first time. The second RAT is different than the first RAT.

20 Claims, 17 Drawing Sheets

(56) References Cited

OTHER PUBLICATIONS

3GPP TS 25.331 V13.2.0 (Mar. 2016); 3rd Generation Partnership Project; Technical Specification Group Radio Access Radio Resource Control (RRC); Protocol specification (Release 13) Network;.

3GPP TS 34.108 V12.1.0 (Sep. 2015); 3rd Generation Partnership Project; Technical Specification Group Radio Access Network; Common test environments for User Equipment (UE); Conformance testing (Release 12).

3GPP TS 24.008 V13.5.0 (Mar. 2016); 3rd Generation Partnership Project; Technical Specification Group Core Network and Terminals; Mobile radio interface Layer 3 specification; Core network protocols; Stage 3 (Release 13).

3GPP TS 24.301 V13.5.0 (Mar. 2016); 3rd Generation Partnership Project; Technical Specification Group Core Network and Terminals; Non-Access-Stratum (NAS) protocol for Evolved Packet System (EPS); Stage 3 (Release 13).

International Search Report and Written Opinion of the International Searching Authority issued in International Application No. PCT/EP2017/065804 dated Oct. 2, 2017; 10 pages.

* cited by examiner

Example of CR, TS 36.331:

5.3.7.2      Initiation
(...)
Upon initiation of the procedure, the UE shall:
   1> stop timer T310, if running;
   1> stop timer T312, if running;
   1> stop timer T313, if running;
   1> stop timer T307, if running;
   1> start timer T311;
   1> suspend all RBs except SRB0;
   1> (...)
   1> perform cell selection in accordance with the cell selection process as specified in TS 36.304 [4];
   While T311 is running, if the UE was having a Voice call or emergency call the UE shall perform only LTE measurements in order to minimise e.g. E-UTRAN voice dropped calls.

Other solutions include:

NOTE: While T311 is running, the UE may perform only LTE measurements in order to minimise e.g. E-UTRAN voice dropped calls.

NOTE: While T311 is running, the UE may not attempt UTRAN or GERAN measurements in order to minimise e.g. E-UTRAN voice dropped calls.

NOTE: While T311 is running, if the UE is having a voice call the UE may attempt to select a suitable cell on an EUTRA carrier.

NOTE: While T311 is running and if the UE was engaged in an MMTEL voice call the UE shall search only for EUTRAN cells.

FIG. 4

Example of CR, TS 36.331:

5.3.7.2     Initiation
(...)
Upon initiation of the procedure, the UE shall:
- 1> stop timer T310, if running;
- 1> stop timer T312, if running;
- 1> stop timer T313, if running;
- 1> stop timer T307, if running;
- 1> start timer T311;
- 1> suspend all RBs except SRB0;
- 1> (...)
- 1> perform cell selection in accordance with the cell selection process as specified in TS 36.304 [4];

While T311 is running, the UE shall not attempt NAS registration on another RAT than E-UTRA (e.g. IMSI attach or GPRS attach as specified in TS 24.008 [49]) if the UE has an ongoing MMTEL-voice call.

Extract from TS 36.331, example of CR:

5.3.5.8     Radio Configuration involving full configuration option

The UE shall:

1> release/ clear all current dedicated radio configurations except the MCG C-RNTI, the MCG security configuration and the PDCP, RLC, logical channel configurations for the RBs and the logged measurement configuration;

NOTE 1: Radio configuration is not just the resource configuration but includes other configurations like *MeasConfig* and *OtherConfig*.

1> if the *RRCConnectionReconfiguration* message includes the *mobilityControlInfo*:

2> release/ clear all current common radio configurations;

2> use the default values specified in 9.2.5 for timer T310 and constant N310, N311;

2> if the UE does not have an ongoing MMTEL-voice call:

3> use the default value specified in 9.2.5 for timer T311;

2> else:

3> use the default value specified in 9.2.5 with an additional 2 seconds for timer T311.

1> else:

2> use values for timers T301, T310 and constants N310, N311, as included in *ue-TimersAndConstants* received in *SystemInformationBlockType2*;

2> if the UE does not have an ongoing MMTEL-voice call:

3> use value for timer T311 as included in *ue-TimersAndConstants* received in *SystemInformationBlockType2*;

2> else:

3> use value for timer T311 as included in *ue-TimersAndConstants* received in *SystemInformationBlockType2* with an additional 2 seconds.

5.3.10.7 Radio Link Failure Timers and Constants reconfiguration

The UE shall:

1> if the received *rlf-TimersAndConstants* is set to release:

2> use values for timers T301, T310, ~~T311~~ and constants N310, N311, as included in *ue-TimersAndConstants* received in *SystemInformationBlockType2*;

2> else:

3> use value for timer T311, as included in *ue-TimersAndConstants* received in *SystemInformationBlockType2*;

2> else:

3> use value for timer T311, as included in *ue-TimersAndConstants* received in *SystemInformationBlockType2* with an additional 2 seconds;

1> else:

5.3.7.6  T311 expiry
Upon T311 expiry, the UE shall:
1> If the UE has an ongoing VoLTE call, wait for 2 seconds;
    2> perform the actions upon leaving RRC_CONNECTED as specified in 5.3.12, with release cause 'RRC connection failure';
1> else
    2> perform the actions upon leaving RRC_CONNECTED as specified in 5.3.12, with release cause 'RRC connection failure';

830

FIG. 8C 5.2.2.5    Essential system information missing

The UE shall:

1> if in RRC_IDLE or in RRC_CONNECTED while T311 is running and the UE does not have an ongoing MMTEL-voice call:

2> if the UE is unable to acquire the *MasterInformationBlock* or the *SystemInformationBlockType1*:

3> consider the cell as barred in accordance with TS 36.304 [4]; and

3> perform barring as if *intraFreqReselection* is set to *allowed*, and as if the *csg-Indication* is set to *FALSE*;

2> else if the UE is unable to acquire the *SystemInformationBlockType2*:

3> treat the cell as barred in accordance with TS 36.304 [4];

1> if in RRC_IDLE or in RRC_CONNECTED while T3xx is running and the UE has an ongoing MMTEL-voice call:

2> if the UE is unable to acquire the *MasterInformationBlock* or the *SystemInformationBlockType1*:

3> consider the cell as barred in accordance with TS 36.304 [4]; and

3> perform barring as if *intraFreqReselection* is set to *allowed*, and as if the *csg-Indication* is set to *FALSE*;

2> else if the UE is unable to acquire the *SystemInformationBlockType2*:

3> treat the cell as barred in accordance with TS 36.304 [4];

**5.2.2.6 Actions upon reception of the *MasterInformationBlock* message**

Upon receiving the *MasterInformationBlock* message the UE shall:

1> apply the radio resource configuration included in the *phich-Config*;

1> if the UE is in RRC_IDLE, or if the UE is in RRC_CONNECTED with an ongoing MMTEL-voice call while T311 is running or without an ongoing MMTEL-voice call while T3xx is running:

2> if the UE has no valid system information stored according to 5.2.2.3 for the concerned cell:

3> apply the received value of *dl-Bandwidth* to the *ul-Bandwidth* until *SystemInformationBlockType2* is received;

5.3.5.8 Radio Configuration involving full configuration option

The UE shall:

1> release/ clear all current dedicated radio configurations except the MCG C-RNTI, the MCG security configuration and the PDCP, RLC, logical channel configurations for the RBs and the logged measurement configuration;

NOTE 1: Radio configuration is not just the resource configuration but includes other configurations like *MeasConfig* and *OtherConfig*.

1> if the *RRCConnectionReconfiguration* message includes the *mobilityControlInfo*:

2> release/ clear all current common radio configurations;

2> use the default values specified in 9.2.5 for timer T310, T311, T3xx and constant N310, N311;

1> else:

2> use values for timers T301, T310, T311, T3xx and constants N310, N311, as included in *ue-TimersAndConstants* received in *SystemInformationBlockType2*;

1> (...);

(...)

FIG. 10C 5.3.7.3    Actions following cell selection while T311 or T3xx is running Upon selecting a suitable E-UTRA cell, the UE shall:
1> stop timer T311 or timer T3xx;

1> start timer T301;

1> apply the *timeAlignmentTimerCommon* included in *SystemInformationBlockType2*;

1> initiate transmission of the *RRCConnectionReestablishmentRequest* message in accordance with 5.3.7.4;

NOTE:    This procedure applies also if the UE returns to the source PCell.

Upon selecting an inter-RAT cell, the UE shall:
1> if the selected cell is a UTRA cell, and if the UE supports Radio Link Failure Report for Inter-RAT MRO, include *selectedUTRA-CellId* in the *VarRLF-Report* and set it to the physical cell identity and carrier frequency of the selected UTRA cell;

1> perform the actions upon leaving RRC_CONNECTED as specified in 5.3.12, with release cause 'RRC connection failure';

(...)

5.3.10.7    Radio Link Failure Timers and Constants reconfiguration

The UE shall:
1> if the received *rlf-TimersAndConstants* is set to release:

2> use values for timers T301, T310, T311, T3xx and constants N310, N311, as included in *ue-TimersAndConstants* received in *SystemInformationBlockType2*;

1> (...)

(...)

5.3.7.6    T311 expiry

Upon T311 expiry and the UE does not have an ongoing MMTEL-voice call, the UE shall:
1> perform the actions upon leaving RRC_CONNECTED as specified in 5.3.12, with release cause 'RRC connection failure';

5.3.7.x    T3xx expiry

Upon T3xx expiry and the UE has an ongoing MMTEL-voice call, the UE shall:
1>    perform the actions upon leaving RRC_CONNECTED as specified in 5.3.12, with release cause 'RRC connection failure';

– *RLF-TimersAndConstants*

The IE *RLF-TimersAndConstants* contains UE specific timers and constants applicable for UEs in RRC_CONNECTED.

RLF-TimersAndConstants information element

```
-- ASN1START

RLF-TimersAndConstants-r9 ::=       CHOICE {
    release                             NULL,
    setup                               SEQUENCE {
        t301-r9                             ENUMERATED {
                                                ms100, ms200, ms300, ms400, ms600, ms1000, ms1500,
                                                ms2000},
        t310-r9                             ENUMERATED {
                                                ms0, ms50, ms100, ms200, ms500, ms1000, ms2000},
        n310-r9                             ENUMERATED {
                                                n1, n2, n3, n4, n6, n8, n10, n20},
        t311-r9                             ENUMERATED {
                                                ms1000, ms3000, ms5000, ms10000, ms15000,
                                                ms20000, ms30000},
        n311-r9                             ENUMERATED {
                                                n1, n2, n3, n4, n5, n6, n8, n10},
        ...
    }
}

RLF-TimersAndConstants-r13 ::=      CHOICE {
    release                             NULL,
    setup                               SEQUENCE {
        t301-v1310                          ENUMERATED {
                                                ms2500, ms3000, ms3500, ms4000, ms5000,
                                                ms6000, ms8000, ms10000},
        t344-v1370                          ENUMERATED {
                                                ms1000, ms3000, ms5000, ms10000, ms15000,
                                                ms20000, ms30000},
        ...
    }
}

RLF-TimersAndConstantsSCG-r12 ::=   CHOICE {
    release                             NULL,
    setup                               SEQUENCE {
        t313-r12                            ENUMERATED {
                                                ms0, ms50, ms100, ms200, ms500, ms1000, ms2000},
        n313-r12                            ENUMERATED {
                                                n1, n2, n3, n4, n5, n6, n8, n10, n20},
        n314-r12                            ENUMERATED {
                                                n1, n2, n3, n4, n5, n6, n8, n10},
        ...
    }
}

-- ASN1STOP
```

| *RLF-TimersAndConstants* field descriptions |
|---|
| *n3xy* |
| Constants are described in section 7.4. n1 corresponds with 1, n2 corresponds with 2 and so on. |
| *t3xy* |
| Timers are described in section 7.3. Value ms0 corresponds with 0 ms, ms50 corresponds with 50 ms and so on. |

— UE-TimersAndConstants

The IE *UE-TimersAndConstants* contains timers and constants used by the UE in either RRC_CONNECTED or RRC_IDLE.

UE-TimersAndConstants information element

```
-- ASN1START

UE-TimersAndConstants ::=       SEQUENCE {
    t300                            ENUMERATED {
                                        ms100, ms200, ms300, ms400, ms600, ms1000, ms1500,
                                        ms2000},
    t301                            ENUMERATED {
                                        ms100, ms200, ms300, ms400, ms600, ms1000, ms1500,
                                        ms2000},
    t310                            ENUMERATED {
                                        ms0, ms50, ms100, ms200, ms500, ms1000, ms2000},
    n310                            ENUMERATED {
                                        n1, n2, n3, n4, n6, n8, n10, n20},
    t311                            ENUMERATED {
                                        ms1000, ms3000, ms5000, ms10000, ms15000,
                                        ms20000, ms30000},
    n311                            ENUMERATED {
                                        n1, n2, n3, n4, n5, n6, n8, n10},
    ...,
    [[  t300-v1310                  ENUMERATED {
                                        ms2500, ms3000, ms3500, ms4000, ms5000, ms6000, ms8000,
                                        ms10000}           OPTIONAL,       -- Need OR
        t301-v1310                  ENUMERATED {
                                        ms2500, ms3000, ms3500, ms4000, ms5000, ms6000, ms8000,
                                        ms10000}           OPTIONAL        -- Need OR
        t3xx-v1320                  ENUMERATED {
                                        ms0, ms50, ms100, ms200, ms500, ms1000,
                                        ms1500}            OPTIONAL        -- Need OR
    ]]
}

-- ASN1STOP
```

| UE-TimersAndConstants field descriptions |
|---|
| n3xy |
| Constants are described in section 7.4. n1 corresponds with 1, n2 corresponds with 2 and so on. |
| t3xy |
| Timers are described in section 7.3. Value ms0 corresponds with 0 ms, ms50 corresponds with 50 ms and so on. EUTRAN includes an extended value *t3xy-v1310* only in the Bandwidth Reduced (BR) version of the SIB. |

RELIABILITY OF VOLTE/VILTE CALLS

TECHNICAL FIELD

This disclosure relates to voice and/or video calls over wireless communication systems and, more specifically, packet-switched voice and/or video calls over Long Term Evolution (LTE) networks.

BACKGROUND

In some cases, a User Equipment (UE) in a Radio Resource Control (RRC) connected mode may have an RRC connection to an Enhanced-Node B (eNB) and a Non-Access Stratum (NAS) signalling connection to a Mobility Management Entity (MME). Both the MME and the eNB may maintain a context for the UE. The UE in the RRC connected mode may monitor a state of its radio connection with a Radio Access Network (RAN). If the UE detects that there is a problem with its radio connection (e.g., a Radio Link Failure (RLF)), the UE may initiate a procedure to re-establish its connection to the RAN. The procedure may include an RRC connection re-establishment procedure and a NAS signalling connection re-establishment procedure (or NAS recovery) if the RRC connection re-establishment procedure is unsuccessful.

DESCRIPTION OF DRAWINGS

FIG. 4 illustrates an example implementation of the example method shown in FIG. 3.

FIG. 6 illustrates an example implementation of the example method shown in FIG. 5.

FIGS. 8A-8C illustrate an example implementation of the example method shown in FIG. 7.

FIGS. 10A-10F illustrate an example implementation of the example method shown in FIG. 9.

Like reference numbers and designations in the various drawings indicate like elements.

DETAILED DESCRIPTION

The present disclosure is directed to improving reliability of Voice over LTE (VoLTE)/Video over LTE (ViLTE) calls. As network operators roll out packet-switched voice support over LTE, for example, for emergency calls and non-emergency calls, reliability of VoLTE/ViLTE calls becomes important. Carriers (e.g., network operators) are sensitive to dropped calls, since dropped calls may affect some key performance indicators (KPIs) for services the carriers provide to their customers. In some cases, dropped calls may result in financial consequences to the carriers.

Reliability of VoLTE/ViLTE calls is particularly important when there is poor LTE coverage, which may lead to Radio Link Failure (RLF). After a User Equipment (UE) detects an RLF when a VoLTE/ViLTE call is in progress, the UE may initiate a connection re-establishment procedure. In some cases, the UE may reselect to a Universal Terrestrial Radio Access Network (UTRAN) or a GSM/EDGE Radio Access Network (GERAN) or a CDMA2000 (Code Division Multiple Access) cell, other than an LTE cell, during the cell selection and connection re-establishment procedure. As a result, the VoLTE/ViLTE call may drop because a different core network is used. In some cases, if the UE registers to the network via a Radio Access Technology (RAT) other than LTE, and starts some user data activity on the RAT other than LTE, the user data activity may prevent subsequent selection of LTE and result in the dropped VoLTE/ViLTE call. Therefore, a method and/or system is needed to reduce dropped call rate resulting from a problem of radio connection (e.g., RLF).

Figure 1:
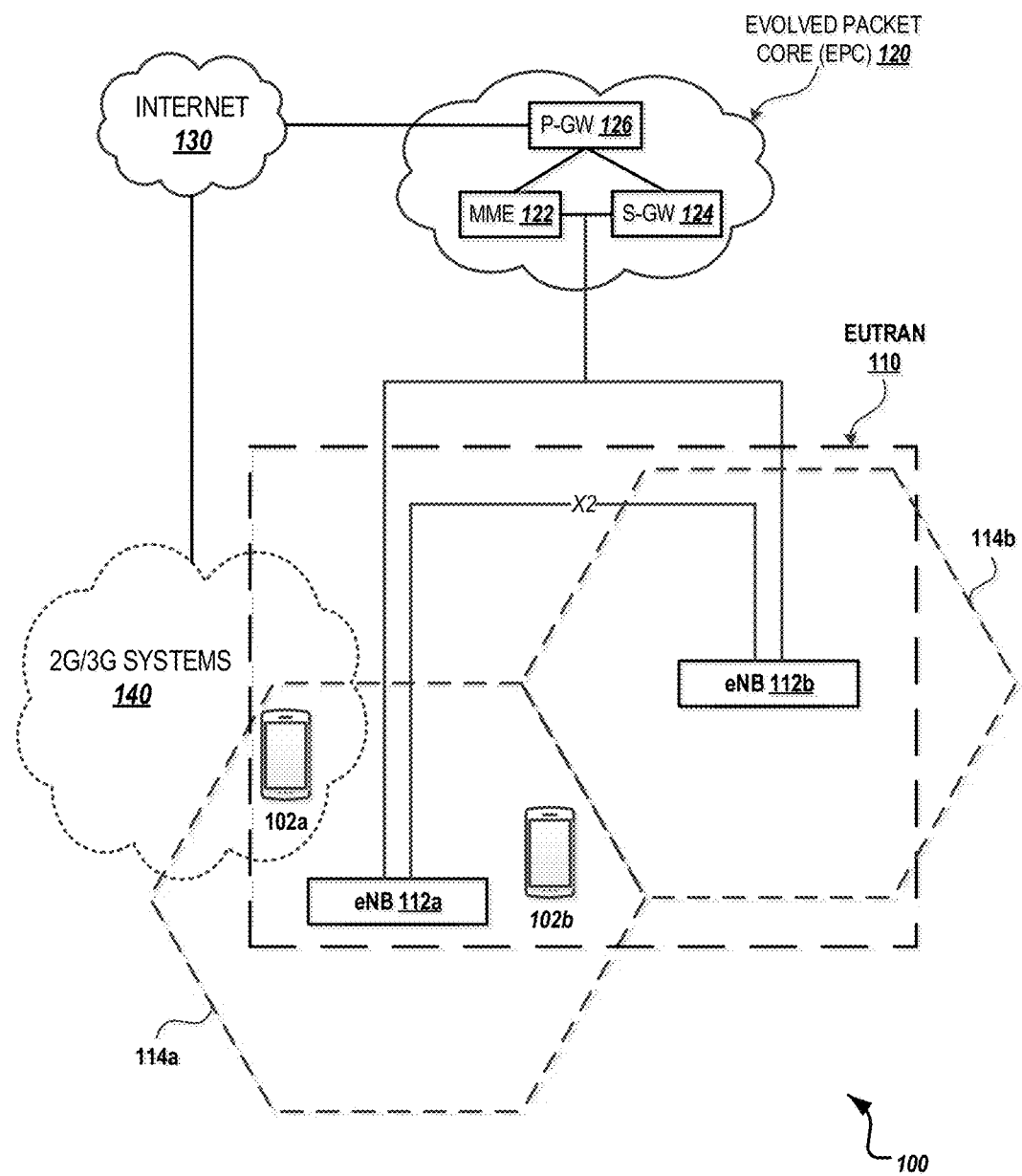
FIG. 1 is an example wireless communication system that improves reliability of Voice over LTE (VoLTE)/Video over LTE (ViLTE) calls.

FIG. 1 is an example wireless communication system 100 that improves reliability of VoLTE/ViLTE calls. The example wireless communication system 100 shown in FIG. 1 includes a plurality of Enhanced-Node Bs (eNBs) (i.e., 112a and 112b). In this disclosure, references to eNB are intended to refer to an access node device, such as a base station or any other communications network node that provides service to a mobile station, including femtocell, picocell, or the like. The example wireless communication system 100 may include Enhanced Universal Terrestrial Radio Access Network (EUTRAN) 110, Evolved Packet Core (EPC) 120, and Internet 130. Furthermore, there may be one or more mobile electronic devices 102 obtaining communication services via the example wireless communication system 100. In some implementations, 2G/3G systems 140 (e.g., Global System for Mobile communication (GSM), Interim Standard 95 (IS-95), Universal Mobile Telecommunications System (UMTS), UTRAN, GERAN) and/or CDMA2000 systems may also be integrated into the example wireless communication system 100.

As illustrated in FIG. 1, the EUTRAN 110 includes eNB 112a and eNB 112b. Cell 114a is the service area of eNB 112a and cell 114b is the service area of eNB 112b. The term cell is intended to describe a coverage area associated with a base station and may or may not overlap with the coverage areas associated with other base stations. In FIG. 1, UE 102a and UE 102b operate in cell 114a and are served by eNB 112a. The EUTRAN 110 can include one or a plurality of eNBs 112 and one or a plurality of UEs 102 can operate in a cell. The eNBs 112 communicate directly to the UEs 102. In some implementations, the eNBs 112 may be in a one-to-many relationship with the UEs 102, e.g., eNB 112a in the example wireless communication system 100 can serve multiple UEs 102 (i.e., UE 102a and UE 102b) within its coverage area cell 114a, but each of UE 102a and UE 102b may be connected only to one eNB 112a at a time for the RRC connection. In some implementations, the eNBs 112 may be in a many-to-many relationship with the UEs 102, e.g., UE 102a and UE 102b can be connected to eNB 112a and eNB 112b. The eNB 112a may be connected to eNB 112b with which handover may be conducted if one or both of UE 102a and UE 102b travels from cell 114a to cell 114b. UE 102 may be any communications device used by an end-user to communicate, for example, within the wireless communication system 100. The UE 102 may alternatively be referred to as mobile electronic device, user equipment, user device, mobile device, mobile station, mobile equipment, subscriber station, or wireless terminal.

In some embodiments, UE 102 may be a cellular phone, personal data assistant (PDA), smart phone, laptop, tablet personal computer (PC), pager, portable computer, or other types of mobile communications device, including communications apparatus used in wirelessly connected automobiles, appliances, or clothing.

UEs 102 may transmit and/or receive voice, video, multimedia, text, web content, and/or any other user/client-specific content. On the one hand, the transmission of some of these contents, e.g., video and web content, may require high channel throughput to satisfy the end-user demand. On the other hand, the channel between UEs 102 and eNBs 112 may be contaminated by multipath fading, due to the multiple signal paths arising from many reflections in the wireless environment. Accordingly, the UEs' transmission may adapt to the wireless environment. In short, UEs 102 generate requests, send responses, or otherwise communicate in different means with EPC 120 and/or Internet 130 through one or more eNBs 112.

A radio access network (RAN) is part of a mobile telecommunication system which implements a radio access technology (RAT), such as UTRAN, GERAN, CDMA2000, and LTE. In many applications, the RAN included in an LTE telecommunications system is called EUTRAN 110. The EUTRAN 110 can be located between UEs 102 and EPC 120. The EUTRAN 110 includes at least one eNB 112. The eNB can be a radio base station that may control all or at least some radio related functions in a fixed part of the system. The at least one eNB 112 can provide radio interface within their coverage area or a cell for UEs 102 to communicate. eNBs 112 may be distributed throughout the communications network to provide a wide area of coverage. The eNB 112 directly communicates to one or a plurality of UEs 102, other eNBs, and the EPC 120.

The eNB 112 may be the end point of the radio protocols towards UE 102 and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME) 122, a serving gateway (S-GW) 124, and a packet data network gateway (P-GW) 126. The MME 122 may be the main control element in the EPC 120 responsible for the functionalities including the control plane functions related to subscriber and session management. The S-GW 124 can serve as a local mobility anchor, such that the packets are routed through this point for intra EUTRAN 110 mobility and mobility with other legacy 2G/3G systems 140. The S-GW functions may include the user plane tunnel management and switching. The P-GW 126 may provide connectivity to the services domain including Internet 130. The UE 102, EUTRAN 110, and EPC 120 are sometimes referred to as the Evolved Packet System (EPS). It is to be understood that the architectural evolvement of the LTE telecommunications system is focused on the EPS. The functional evolution may include both EPS and Internet 130.

As illustrated in FIG. 1, UE 102a is under coverage of a number of cells using a number of RATs and Systems (e.g., EUTRAN 110, 2G/3G systems 140). For example, UE 102a may be camped on an LTE cell 114a, having a VoLTE/ViLTE call using EPC 120. In some cases, control signalling may take place between the UE 102a and eNB 112a (e.g., Access Stratum (AS) signalling) and between the UE 102a and MME 122 (e.g., Non Access Stratum (NAS) signalling). For example, UE 102a in an RRC connected mode may have an RRC connection to eNB 112a and a NAS signalling connection to MME 122. Both the MME 122 and the eNB 112a may maintain a context for UE 102a. In operation, UE 102a in an RRC connected mode monitors a state of its radio connection with the EUTRAN 110. If UE 102a detects that there is a problem (e.g., RLF) with its radio connection, UE 102a may initiate a procedure to re-establish its connection to the EUTRAN 110.

In some cases, upon detection of RLF, UE 102a may initiate an RRC connection re-establishment procedure. Other situations (e.g., handover failure, integrity check failure, RRC connection reconfiguration failure) may also trigger the RRC connection re-establishment procedure. In the RRC connection re-establishment procedure, UE 102a may suspend all radio bearers except Signalling Radio Bearer 0, start a timer T311 (i.e., RRC re-establishment timer), and perform cell selection. In some implementations, a value of the timer T311 may be conveyed to UE 102a via RRC signalling. In some implementations, a value of the timer T311 may be a default value. The UE 102a may select a suitable LTE or non-LTE cell as a result of the cell selection process. If the UE 102a selects a non-LTE cell (e.g., a cell in 2G/3G systems 140), an active VoLTE/ViLTE call on the UE 102a may drop since a different core network, other than EPC 120, is used. If the RRC connection re-establishment procedure is unsuccessful (e.g., no suitable cell is found upon T311 expiry), UE 102a may initiate a NAS procedure to recover the connection to EUTRAN 110 (i.e., NAS signalling connection re-establishment procedure or NAS recovery) (discussed in more detail in FIG. 2 below). In some cases, if UE 102a registers its presence to the network via a RAT other than LTE (e.g., NAS registration via 2G/3G RAT) and starts some user data activity on the RAT other than LTE, the user data activity may prevent subsequent selection of LTE in the event of an RRC connection re-establishment procedure and/or a NAS signalling connection re-establishment procedure. As a result, the prevention of subsequent selection of LTE may cause an active VoLTE/ViLTE call on the UE 102a to be dropped because of, for example, core network change.

In some implementations, to reduce dropped call rate caused by the cell selection process, T311 may be used as a time threshold at which point the choice of frequencies or RATs chosen for the scanning in the cell selection process is changed. For example, priority may be given to the LTE RAT before T311 expiry, so that only LTE frequencies are scanned in the RRC connection re-establishment procedure. As a result, a non-LTE cell may not be selected in the RRC connection re-establishment procedure, and an active VoLTE/ViLTE call on the UE 102a may not drop because of, for example, a different core network. In some implementations, while T311 is running, only few non-LTE frequencies can be scanned/measured in addition to LTE frequencies. After T311 has expired, the scan pattern may be changed to increase the scan of non-LTE frequencies. In some implementations, the frequency scan pattern change may be used for radio connection problem (e.g., RLF) for RATs other than LTE. For example, UE 102a may modify its scan algorithm after a time duration, other than T311, of radio connection re-establishment has elapsed. In some implementations, the change of scanning priority/pattern may happen when UE 102a is involved in a voice call and/or a multimedia call. If UE102a is not involved in a voice call and/or a multimedia call, a different scanning strategy may be used.

In some implementations, to reduce dropped call rate caused by NAS registration, UE 102a may not perform NAS registration via RATs other than LTE after a problem with the RRC connection is detected (e.g. RLF) within a timer duration. A NAS registration may consist in the IMSI Attach procedure or GPRS Attach procedure as specified in 3GPP TS 24.008 for the example of GERAN/UTRAN. During that timer duration, even if other RATs, other than LTE, are found, the UE 102a may not perform NAS registration with the other RATS. For example, the UE 102a may wait for the timer to expire before performing the NAS registration with the other RATS. Blocking NAS registration on other RATs within the timer duration allows UE 102a to resume connection with an LTE cell, if an LTE RRC connection re-establishment procedure towards the LTE cell is successful. In some implementations, while refraining from performing the NAS registration via RATs other than LTE, the UE 102a may search for RATs other than LTE. Searching for RATS other than LTE may provide information to help find LTE cells/frequencies. For example, a UMTS cell may provide information about neighbouring LTE cells/frequencies. In some implementations, NAS registration on other RATs within the timer duration may be blocked when UE 102a is involved in a voice call and/or a multimedia call before the RRC connection problem (e.g. RLF) is detected.

In some implementations, to increase success of RRC recovery, UE 102a may attempt an RRC re-establishment even after T311 has expired. For example, an RRC connection re-establishment procedure may be performed for a longer duration than a time value of T311. In other words, UE 102a may use a value that is longer than a value signalled by the network for T311 (or that is longer than the default value if no value is signalled by the network). In some implementations, the RRC connection re-establishment procedure may be performed for a duration that is equal to a Real Time Protocol (RTP) timeout value. In some implementations, the long T311 may be used for the RRC connection re-establishment procedure when UE 102a is involved in a voice call and/or a multimedia call before the RRC connection problem (e.g. RLF) is detected. In some implementations, the use of a timer longer than the re-establishment timer may be used for radio connection problem (e.g., RLF) for RATs other than LTE.

In some implementations, the network may send a different value of T311 or a new timer (i.e., RRC re-establishment timer for IP Multimedia Subsystem (IMS) multimedia telephony service (MMTEL) voice calls) to UE 102a for MMTEL Voice calls. In some implementations, the different value of T311 or the new timer may be conveyed to UE 102a via RRC signalling. As a result, the network may signal a timer longer than T311 for specific services (e.g., voice) and may increase success of RRC connection re-establishment procedure. In some implementations, a default value may be specified if the parameter is not signalled from the network to the device. In some implementations, the use of a timer different than the re-establishment timer may be used for radio connection problem (e.g., RLF) for RATs other than LTE. In some implementations, the different value of T311 or the new timer may be used for the RRC connection re-establishment procedure when UE 102a is involved in a voice call and/or a multimedia call before the RRC connection problem (e.g. RLF) is detected.

In some implementations, using T311 as an input to scan algorithm, not registering on other RATs within a timer duration, using a long T311 under some scenarios, and using a different T311 as described above may be performed individually or in any combinations. For example, if a different timer T311 (e.g., a T311 with a different value) is used, the different value may be used for the timer duration during which NAS registration on other RATs is not performed.

Though described in terms of FIG. 1, the present disclosure is not limited to such an environment. In general, telecommunication systems may be described as communications networks made up of a number of radio coverage areas, or cells that are each served by a base station or other fixed transceiver. Example telecommunication systems include Global System for Mobile Communication (GSM) protocols, Universal Mobile Telecommunications System (UMTS), 3GPP Long Term Evolution (LTE), LTE-Advanced, 5G, and others. In addition to telecommunication systems, wireless broadband communication systems may also be suitable for the various implementations described in the present disclosure. Example wireless broadband communication systems include IEEE 802.11 wireless local area network, IEEE 802.16 WiMAX network, etc.

Figure 2:
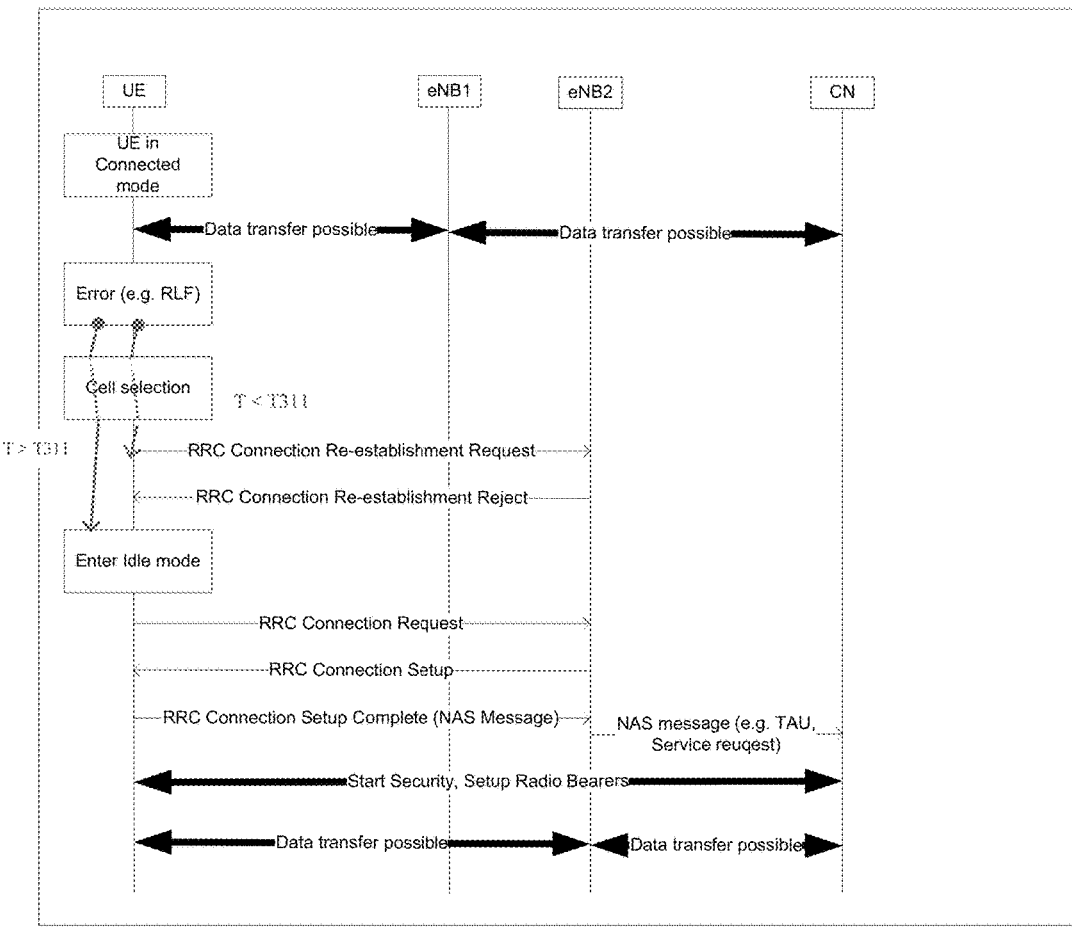
FIG. 2 illustrates an example message sequence for Non-Access Stratum (NAS) signalling connection re-establishment.

FIG. 2 illustrates an example message sequence 200 for Non Access Stratum (NAS) signalling connection re-establishment. The example message sequence 200 starts at a UE in an RRC connected mode in a cell under eNB1. Data can be transferred between the UE and a core network (CN) via eNB1. The UE, in the RRC connected mode, monitors a state of its radio connection. If the UE detects that there is a problem with its radio connection (e.g., RLF), the UE initiates a procedure to re-establish its connection. An RRC connection re-establishment procedure is first initiated. In the RRC connection re-establishment procedure, the UE suspends all radio bearers except Signalling Radio Bearer 0, starts a timer T311, and performs cell selection (e.g., cell selection process described in 3GPP TS 36.304). If the UE cannot find a cell upon T311 expiry, the RRC connection re-establishment procedure is unsuccessful and the UE enters an idle mode. If the UE finds a suitable LTE cell under eNB2 while T311 is running, but fails to establish a radio connection with the eNB2 (e.g., eNB2 does not have a context for the UE), the RRC connection re-establishment procedure is unsuccessful and the UE enters an idle mode.

When the RRC connection re-establishment procedure is unsuccessful, the RRC protocol layer (e.g., an Access Stratum (AS) protocol layer) informs the NAS protocol layers that the RRC connection has been released and the UE has entered the RRC idle mode. The UE, then, initiates a NAS procedure to recover the connection to the network (e.g., the NAS signalling connection re-establishment procedure or NAS recovery described in 3GPP TS 24.301). Unlike the RRC connection re-establishment procedure, the NAS procedure does not rely on the target eNB having a context for the particular UE. As a result, the UE establishes an RRC connection with the eNB2 (e.g., according to process described in 3GPP TS 36.331). At the conclusion of the NAS procedure, the UE enters an RRC connected mode, and is connected again via a different cell under eNB2.

FIGS. 3-10 and associated descriptions provide additional details for example implementations.

Figure 3:
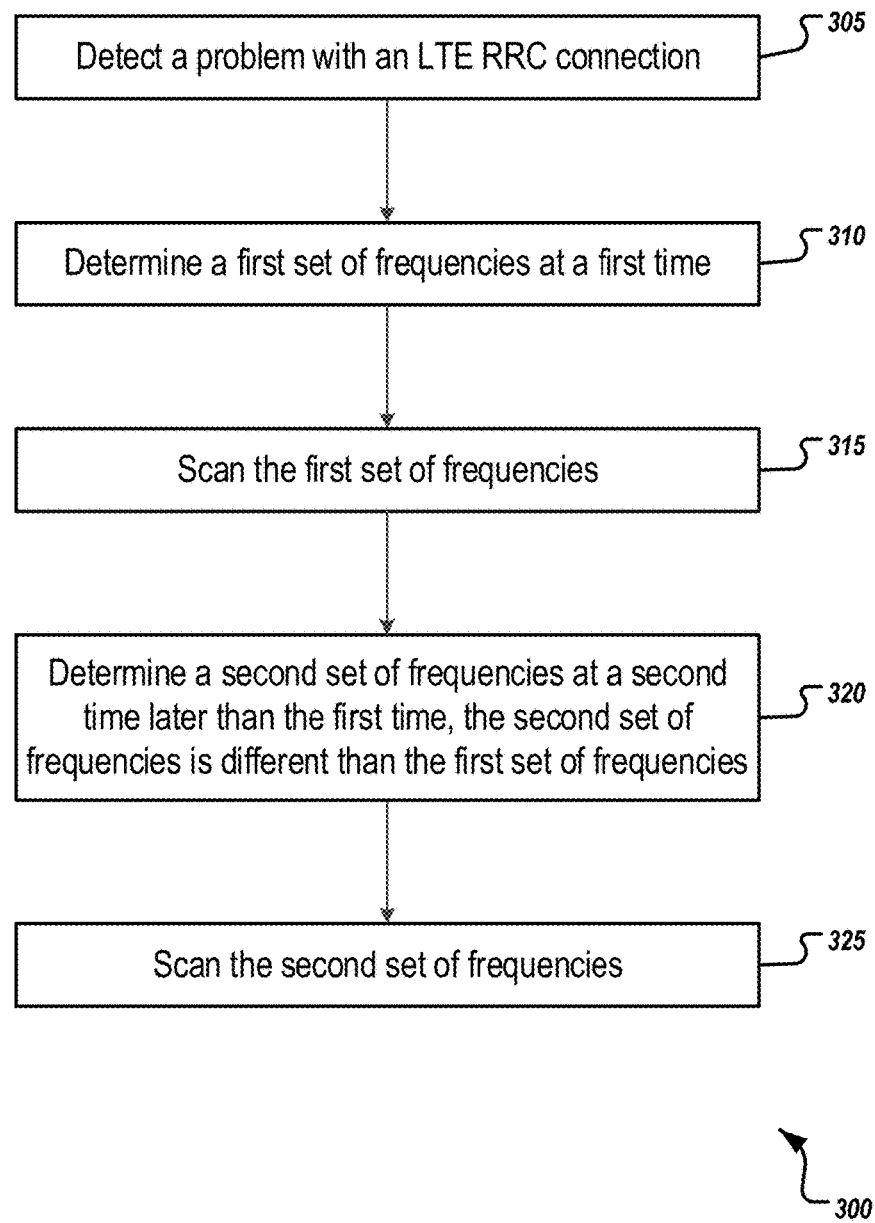
FIG. 3 is a flowchart illustrating an example method for improving reliability of VoLTE/ViLTE calls.

FIG. 3 is a flowchart illustrating an example method 300 for improving reliability of VoLTE/ViLTE calls. The example method 300 can be implemented in a wireless communication system. For example, the example method 300 can be implemented by one or more components of the example wireless communication system 100, shown in FIG. 1, or by a different type of system. In some cases, some or all aspects of the example method 300 can be executed by a wireless terminal (e.g., UEs 102a and 102b of FIG. 1) or another type of wireless terminal. In some cases, the example method 300 can be executed by multiple components, devices, or subsystems of the type shown in FIG. 1, or components, devices, or subsystems of additional or different types.

The example method 300 shown in FIG. 3 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 3 can be executed as multiple separate operations, or one or more subsets of the operations shown in FIG. 3 can be combined and executed as a single operation.

At 305, a problem with a Long Term Evolution (LTE) Radio Resource Control (RRC) connection is detected by a User Equipment (UE). In some implementations, the problem with LTE RRC connection is a Radio Link Failure (RLF), a handover failure, an integrity check failure, or an RRC connection reconfiguration failure.

At 310, after detecting the problem with the LTE RRC connection, a first set of frequencies/cells is determined at a first time. In some implementations, a T311 timer starts at the first time. In some implementations, the first set of frequencies includes only LTE frequencies/cells. In some implementations, the first set of frequencies/cells may include few non-LTE frequencies/cells in addition to LTE frequencies/cells. In some implementations, determining the first set of frequencies/cells is automatically performed by the UE, in response to the detection of the problem with the LTE RRC connection. At 315, the UE scans the first set of frequencies/cells. In some implementations, the UE scans and/or measures the first set of frequencies/cells to find a suitable LTE cell to re-establish the LTE RRC connection.

At 320, a second set of frequencies/cells is determined at a second time later than the first time. A time difference between the second and the first time is substantially similar to a value of the T311 timer. In some implementations, the T311 timer expires at the second time (e.g., scan pattern change upon T311 expiry). The first set of frequencies/cells is different than the second set of frequencies/cells. In some implementations, the second set of frequencies/cells includes LTE frequencies/cells and other non-LTE frequencies/cells. In some implementations, the second set of frequencies/cells includes more non-LTE frequencies/cells than the first set of frequencies/cells. In some implementations, determining the second set of frequencies/cells is automatically performed by the UE upon T311 expiry. At 325, the UE scans the second set of frequencies/cells. In some implementations, the UE scans and/or measures the second set of frequencies/cells to find a suitable LTE cell to re-establish the connection to the network. In some implementations, determining and/or scanning the second set of frequencies/cells are performed if the UE has a voice call or a multimedia call when detecting the problem with LTE RRC connection. In some implementations, if the UE does not has a voice call or a multimedia call when detecting the problem with LTE RRC connection, the first set of frequencies may be the same as the second set of frequencies, both including LTE frequencies and other non-LTE frequencies. Other criteria for selecting a different set of frequencies may include a determination that the UE is having a voice connection, a voice emergency connection, a video call connection, or any connection that is considered as from a Conversational Quality of Service. The Conversational Quality of Service may be based on application type, Data Radio Bearer (DRB), Quality of Service Class Identifier (QCI) (e.g., Guaranteed Bit Rate (GBR) and/or Voice specific), and/or Bearer QoS.

In some implementations, the example method 300 may be modified to apply to a UE using RATs other than LTE when there is a radio connection problem. For example, a UE on a CDMA 2000 cell may determine a first set of frequencies/cells including only CDMA 2000 frequencies/cells at a first time (310) and determine a second set of frequencies/cells including both CDMA 2000 frequencies and non-CDMA 2000 frequencies at a second time (320). A time difference between the second and the first time is substantially similar to a value of a connection re-establishment timer suitable for CDMA 2000 (e.g., scan pattern change upon the timer expiry).

FIG. 4 illustrates an example implementation 400 of the example method 300 shown in FIG. 3. The example implementation 400 uses T311 as a time threshold at which point the choice of frequencies or RAT chosen for scanning changes. In other words, the pattern of frequencies/RATs scanned changes upon T311 expiry. In the example implementation 400, priority is given to LTE RAT before T311 expiry, so that only LTE frequencies are scanned. In some implementations, the scan pattern change happens only if the UE is configured with one or more bearers that has a Quality of Service associated to Guaranteed Bit Rate (GBR) and/or certain QoS Class Identifier(s) (QCI(s)). In some implementations, LTE frequencies are scanned for a duration of T311, then other RATs are scanned. The overall scanning may be repeated or iterated for a long duration (e.g., 10 minutes, 15 minutes, 20 minutes). In some implementations, only the overall second part of the pattern is repeated for a long duration. In some implementations, LTE frequencies and some specific 3G frequencies are scanned for the duration of T311, then remaining 3G frequencies and other RATs are scanned. The overall scanning may be repeated or iterated for a long duration (e.g., 10 minutes). In some implementations, only the second part of the overall pattern is repeated for a long duration.

Figure 5:
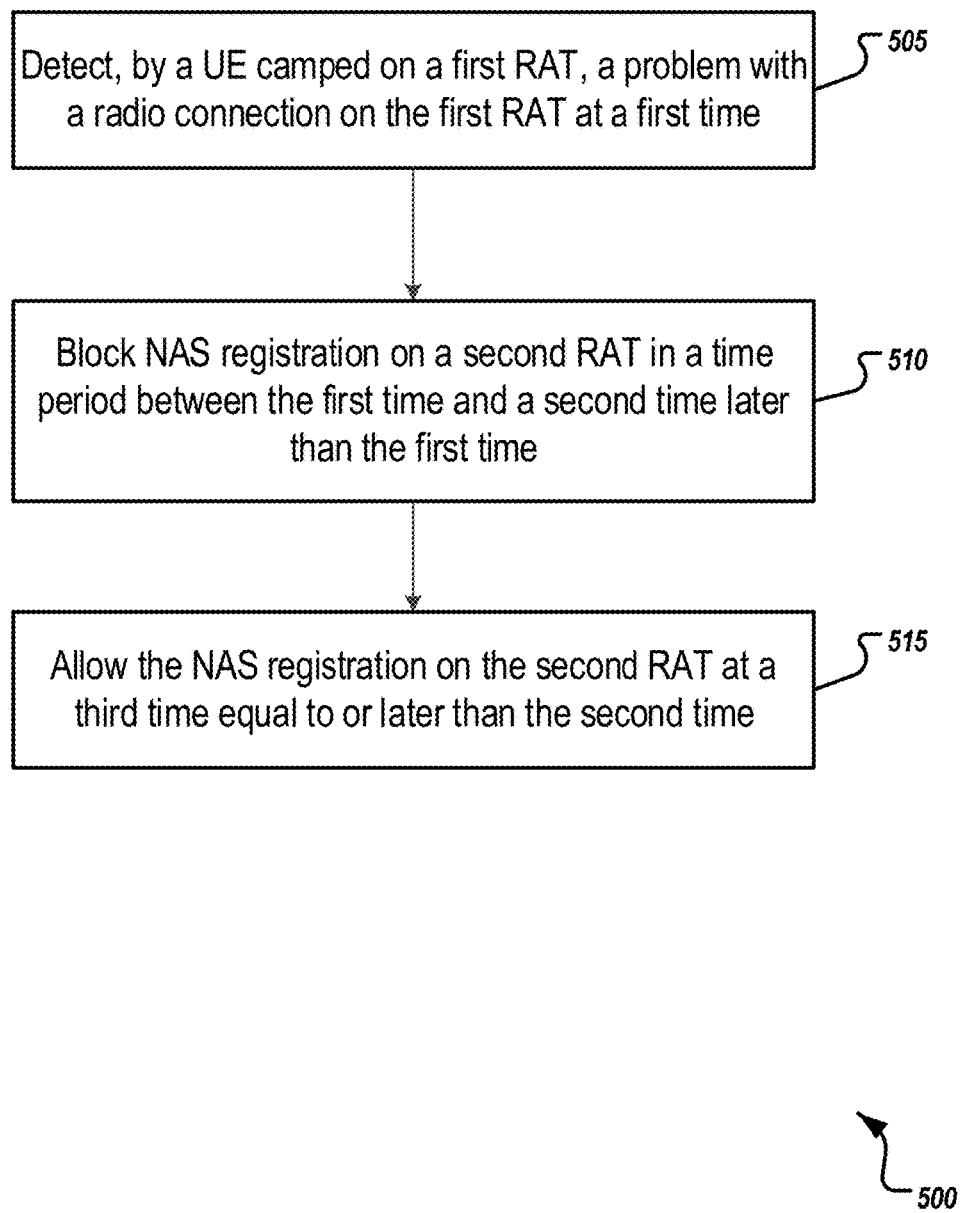
FIG. 5 is a flowchart illustrating another example method for improving reliability of VoLTE/ViLTE calls.

FIG. 5 is a flowchart illustrating another example method 500 for improving reliability of VoLTE/ViLTE calls. The example method 500 can be implemented in a wireless communication system. For example, the example method 500 can be implemented by one or more components of the example wireless communication system 100, shown in FIG. 1, or by a different type of system. In some cases, some or all aspects of the example method 500 can be executed by a wireless terminal (e.g., UEs 102a and 102b of FIG. 1) or another type of wireless terminal. In some cases, the example method 500 can be executed by multiple components, devices, or subsystems of the type shown in FIG. 1, or components, devices, or subsystems of additional or different types.

The example method 500 shown in FIG. 5 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 5 can be executed as multiple separate operations, or one or more subsets of the operations shown in FIG. 5 can be combined and executed as a single operation.

At 505, a problem with a radio connection on a first Radio Access Technology (RAT) at a first time is detected by a User Equipment (UE) camped on the first RAT. In some implementations, the problem with the radio connection is a Radio Link Failure (RLF), a handover failure, an integrity check failure, or a connection reconfiguration failure. In some implementations, the first RAT may be UTRAN, GERAN, CDMA 2000, LTE, LTE Advanced, or 5G.

At 510, Non Access Stratum (NAS) registration on a second RAT in a time period between the first time and a second time later than the first time is blocked. The second RAT is different than the first RAT. In some implementations, blocking NAS registration on the second RAT is automatically performed by the UE in response to the detection of the problem with the connection. In some implementations, blocking NAS registration on the second RAT is performed based on a determination that the UE is having a voice connection, a voice emergency connection, a video call connection, or any connection that is considered as from a Conversational Quality of Service. The Conversational Quality of Service may be based on application type, Data Radio Bearer (DRB), Quality of Service Class Identifier (QCI) (e.g., Guaranteed Bit Rate (GBR) and/or Voice specific), and/or Bearer QoS. In some implementations, while blocking NAS registration on the second RAT, a set of frequencies/cells including the second RAT frequencies may be scanned by the UE in the time period.

At 515, the NAS registration on the second RAT is allowed at a third time equal to or later than the second time. In some implementations, the first RAT is an LTE RAT, the second RAT is a non-LTE RAT, the problem with the radio connection is a Radio Link Failure (RLF), and a time difference between the second and the first time is substantially similar to a value of a T311 timer.

In some implementations, a timer starts at the first time and expires at the second time. The value of the timer is set to a value of T311 when the first RAT is an LTE RAT. Blocking NAS registration on non-LTE RATs during LTE RRC connection re-establishment procedure ensures that LTE RRC connection re-establishment can be attempted to its maximum possibility. In some implementations, the value of the timer is set to a value shorter than T311 (e.g., T311—2 seconds). In some implementations, the value of the timer is set to a Real Time Protocol (RTP) timeout value in networks. For example, the RTP timeout value maybe be a value used by networks (e.g., 10 seconds). In some implementations, the value of the timer is set to a value that is network-specific and is stored in the UE (e.g., Universal Integrated Circuit Card (UICC)). For example, the UE may store an association between a network specific timeout value and the network identity (e.g., Public land mobile network (PLMN) id). In some implementations, the value of the timer is set to a value used by a Session Initiation Protocol (SIP) timer. In some implementations, the value of the timer may be signalled from the network to the UE, using NAS signalling (e.g., TS 24.301), AS signalling (e.g., TS 36.331), or by the Home PLMN via OMA DM or SIM Toolkit application.

FIG. 6 illustrates an example implementation 600 of the example method 500 shown in FIG. 5. The example implementation 600 blocks NAS registration on RATs other than LTE, while T311 is running.

Figure 7:
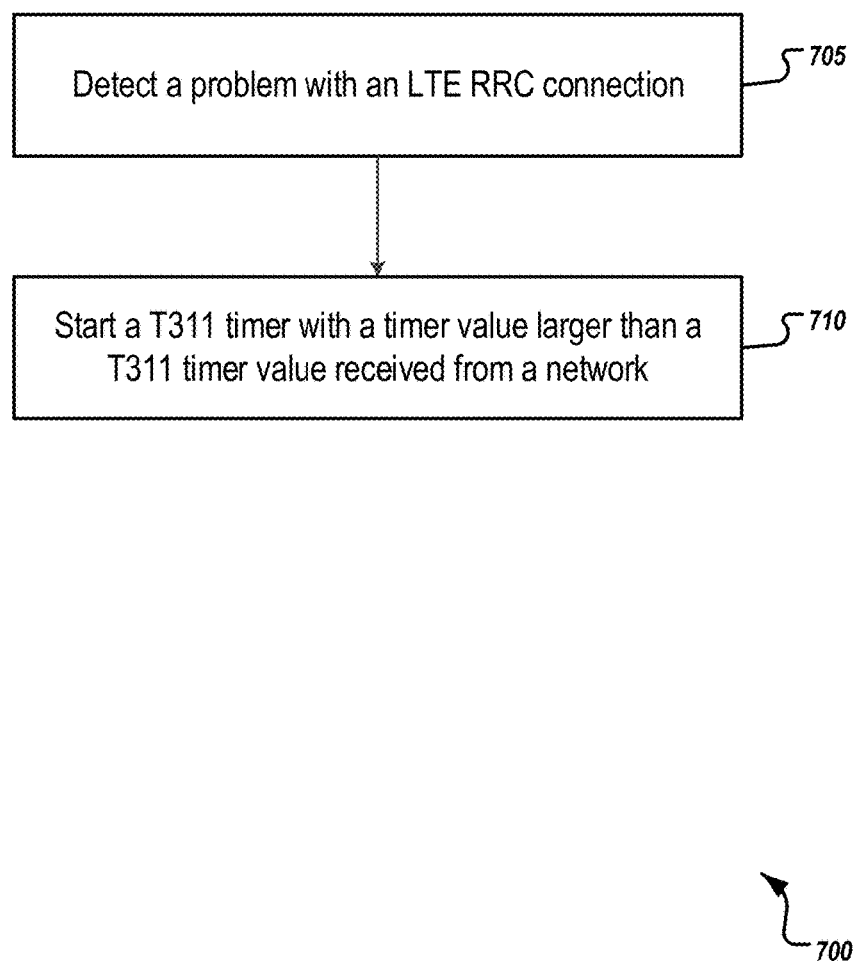
FIG. 7 is a flowchart illustrating another example method for improving reliability of VoLTE/ViLTE calls.

FIG. 7 is a flowchart illustrating another example method 700 for improving reliability of VoLTE/ViLTE calls. The example method 700 can be implemented in a wireless communication system. For example, the example method 700 can be implemented by one or more components of the example wireless communication system 100, shown in FIG. 1, or by a different type of system. In some cases, some or all aspects of the example method 700 can be executed by a wireless terminal (e.g., UEs 102*a* and 102*b* of FIG. 1) or another type of wireless terminal. In some cases, the example method 700 can be executed by multiple components, devices, or subsystems of the type shown in FIG. 1, or components, devices, or subsystems of additional or different types.

The example method 700 shown in FIG. 7 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 7 can be executed as multiple separate operations, or one or more subsets of the operations shown in FIG. 7 can be combined and executed as a single operation.

At 705, a problem with a Long Term Evolution (LTE) Radio Resource Control (RRC) connection is detected by a User Equipment (UE). In some implementations, the problem with the LTE RRC connection is a Radio Link Failure (RLF), a handover failure, an integrity check failure, or an RRC connection reconfiguration failure.

At 710, in response to detecting the problem with LTE RRC connection, a T311 timer is started. A value of the T311 timer is modified to be longer than a value of the T311 timer received from a network. In some implementations, the modified value of the T311 timer is set to a Real Time Protocol (RTP) timeout value in networks. For example, the RTP timeout value maybe be a value used by networks (e.g., 10 seconds). In some implementations, the UE may use a T311 value indicated by the network plus an additional duration for the modified value of the T311 timer. The additional duration may be, for example, 2, 4, or 6 seconds.

In some implementations, modifying the value of the T311 timer is performed based on a determination that the UE is having a voice connection, a voice emergency connection, a video call connection, or any connection that is considered as from a Conversational Quality of Service. The Conversational Quality of Service may be based on application type, Data Radio Bearer (DRB), Quality of Service Class Identifier (QCI) (e.g., Guaranteed Bit Rate (GBR) and/or Voice specific), and/or Bearer QoS.

FIGS. 8A-8C illustrate an example implementation (810, 820, 830) of the example method 700 shown in FIG. 7. The example implementation (810, 820, 830) uses a long T311 for the RRC connection re-establishment procedure when a UE is involved in a voice call and/or a multimedia call. Using the long T311 can increase success of the RRC Recovery, since the UE can attempt RRC re-establishment after a normal T311 expires.

Figure 9:
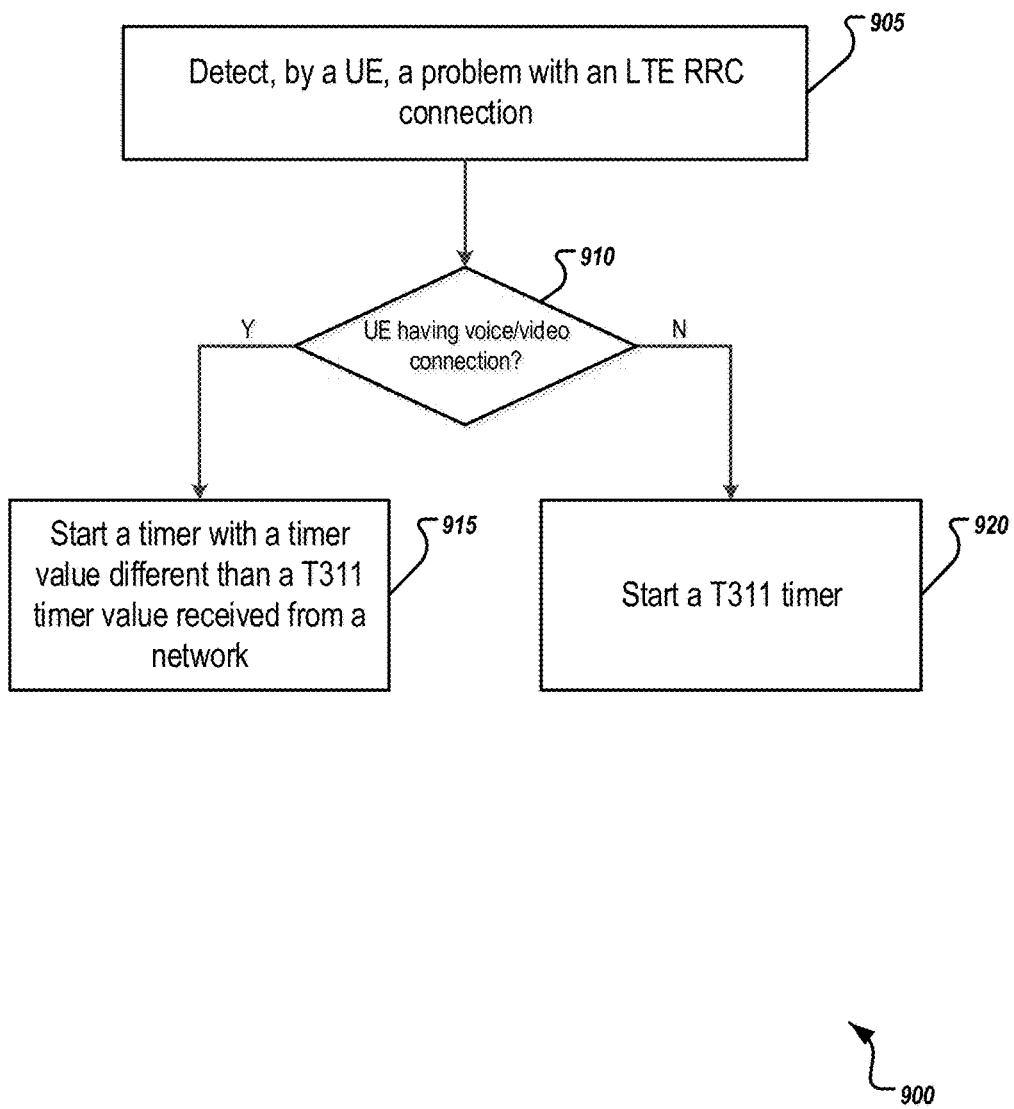
FIG. 9 is a flowchart illustrating another example method for improving reliability of VoLTE/ViLTE calls.

FIG. 9 is a flowchart illustrating another example method 900 for improving reliability of VoLTE/ViLTE calls. The example method 900 can be implemented in a wireless communication system. For example, the example method 900 can be implemented by one or more components of the example wireless communication system 100, shown in FIG. 1, or by a different type of system. In some cases, some or all aspects of the example method 900 can be executed by a wireless terminal (e.g., UEs 102*a* and 102*b* of FIG. 1) or another type of wireless terminal. In some cases, the example method 900 can be executed by multiple components, devices, or subsystems of the type shown in FIG. 1, or components, devices, or subsystems of additional or different types.

The example method 900 shown in FIG. 9 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 9 can be executed as multiple separate operations, or one or more subsets of the operations shown in FIG. 9 can be combined and executed as a single operation.

At 905, a problem with a Long Term Evolution (LTE) Radio Resource Control (RRC) connection is detected by a User Equipment (UE). In some implementations, the problem with the LTE RRC connection is a Radio Link Failure (RLF), a handover failure, an integrity check failure, or an RRC connection reconfiguration failure.

At 910, whether the UE is having a voice connection, a voice emergency connection, a video call connection, or any connection that is considered as from a Conversational Quality of Service is determined. If the UE is having the voice connection, the voice emergency connection, the video call connection, or any connection that is considered as from the Conversational Quality of Service, then the method proceeds to 915. Otherwise, the method proceeds to 920.

At 915, a timer starts. In some implementation, the timer is a new timer different than a T311 timer. In some implementations, the timer is a T311 timer with a value different than a value of the T311 timer received from a network. In some implementations, the new timer and/or the different value of the T311 timer may be signalled from the network to the UE. At 920, the T311 timer starts.

FIGS. 10A-10F illustrate an example implementation (1010, 1020, 1030, 1040, 1050, 1060) of the example method 900 shown in FIG. 9. The example implementation (1010, 1020, 1030, 1040, 1050, 1060) introduces a new timer T3xx (i.e., RRC re-establishment timer for MINITEL voice calls). Instead of starting a T311 timer, the new timer T3xx may start when the UE has an ongoing MMTEL voice call. In addition, a new parameter T3xx-Voice is introduced in the signalling procedure (e.g., 3GPP TS 36.331). The new parameter may allow the network to signal a long value timer for specific services (e.g., voice) and increase success of RRC connection re-establishment.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method, comprising:
   detecting, by a User Equipment (UE) camped on a first Radio Access Technology (RAT), a problem with a radio connection on the first RAT at a first time; and
   in response to detecting the problem with the radio connection on the first RAT at the first time, blocking, by the UE, Non Access Stratum (NAS) registration on a second RAT in a time period between the first time and a second time later than the first time.

2. The method of claim 1, wherein the first RAT is a Long Term Evolution (LTE) RAT, the second RAT is a non-LTE RAT, and the problem with the radio connection is a Radio Link Failure (RLF).

3. The method of claim 1, further comprising:
   scanning, by the UE, a set of frequencies including the second RAT frequencies in the time period.

4. The method of claim 1, further comprising:
   allowing, by the UE, the NAS registration on the second RAT at a third time equal to or later than the second time.

5. The method of claim 1, wherein blocking NAS registration on the second RAT is performed based on a determination that the UE is having a voice connection, a voice emergency connection, a video call connection, or any connection that is considered as from a Conversational Quality of Service.

6. The method of claim 1, wherein a time difference between the second and the first time is substantially similar to a value of a T311 timer, shorter than the value of the T311 timer, or substantially similar to a value of a Real Time Protocol (RTP) timer.

7. The method of claim 1, wherein the second RAT is different than the first RAT.

8. A device camped on a first Radio Access Technology (RAT), comprising:
   a memory; and
   at least one processor communicatively coupled with the memory and configured to:
   detect a problem with a radio connection on the first RAT at a first time; and
   in response to detecting the problem with the radio connection on the first RAT at the first time, block Non-Access Stratum (NAS) registration on a second RAT in a time period between the first time and a second time later than the first time.

9. The device of claim 8, wherein the first RAT is a Long Term Evolution (LTE) RAT, the second RAT is a non-LTE RAT, and the problem with the radio connection is a Radio Link Failure (RLF).

10. The device of claim 8, wherein the at least one processor is further configured to:
    scan a set of frequencies including the second RAT frequencies in the time period.

11. The device of claim 8, wherein the at least one processor is further configured to:
    allow the NAS registration on the second RAT at a third time equal to or later than the second time.

12. The device of claim 8, wherein blocking NAS registration on the second RAT is performed based on a determination that the device is having a voice connection, a voice emergency connection, a video call connection, or any connection that is considered as from a Conversational Quality of Service.

13. The device of claim 8, wherein a time difference between the second and the first time is substantially similar to a value of a T311 timer, shorter than the value of the T311 timer, or substantially similar to a value of a Real Time Protocol (RTP) timer.

14. The device of claim 8, wherein the second RAT is different than the first RAT.

15. A non-transitory computer-readable medium containing instructions which, when executed, cause a computing device camped on a first Radio Access Technology (RAT) to perform operations comprising:
   detecting a problem with a radio connection on the first RAT at a first time; and
   in response to detecting the problem with the radio connection on the first RAT at the first time, blocking Non Access Stratum (NAS) registration on a second RAT in a time period between the first time and a second time later than the first time.

16. The non-transitory computer-readable medium of claim 15, wherein the first RAT is a Long Term Evolution (LTE) RAT, the second RAT is a non-LTE RAT, and the problem with the radio connection is a Radio Link Failure (RLF).

17. The non-transitory computer-readable medium of claim 15, wherein the operations further comprise:
   scanning a set of frequencies including the second RAT frequencies in the time period.

18. The non-transitory computer-readable medium of claim 15, wherein the operations further comprise:
   allowing the NAS registration on the second RAT at a third time equal to or later than the second time.

19. The non-transitory computer-readable medium of claim 15, wherein blocking NAS registration on the second RAT is performed based on a determination that the computing device is having a voice connection, a voice emergency connection, a video call connection, or any connection that is considered as from a Conversational Quality of Service.

20. The non-transitory computer-readable medium of claim 15, wherein a time difference between the second and the first time is substantially similar to a value of a T311 timer, shorter than the value of the T311 timer, or substantially similar to a value of a Real Time Protocol (RTP) timer.

* * * * *